United States Patent
Maekawa et al.

(10) Patent No.: US 7,535,881 B2
(45) Date of Patent: May 19, 2009

(54) COMMUNICATION TERMINAL AND METHOD OF ESTABLISHING COMMUNICATION

(75) Inventors: Itaru Maekawa, Nagano (JP); Kazushige Taniguchi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 595 days.

(21) Appl. No.: 11/194,135

(22) Filed: Jul. 29, 2005

(65) Prior Publication Data
US 2006/0034315 A1 Feb. 16, 2006

(30) Foreign Application Priority Data
Jul. 30, 2004 (JP) .............................. 2004-224779

(51) Int. Cl.
*H04Q 7/24* (2006.01)
(52) U.S. Cl. ..................... 370/338; 370/311; 455/574
(58) Field of Classification Search ........................ None
See application file for complete search history.

(56) References Cited

U.S. PATENT DOCUMENTS

| | | | |
|---|---|---|---|
| 5,618,045 A | 4/1997 | Kagan et al. | |
| 5,777,570 A * | 7/1998 | Kokubu | .................. 341/173 |
| 2003/0197488 A1 | 10/2003 | Hulvey | |
| 2004/0259642 A1 | 12/2004 | Tanaka et al. | |

FOREIGN PATENT DOCUMENTS

| | | |
|---|---|---|
| EP | 1 022 876 | 7/2000 |
| JP | 2-186844 | 7/1990 |
| JP | 4-359176 | 12/1992 |
| JP | 9-233542 | 9/1997 |
| JP | 2003-298596 | 10/2003 |
| JP | 2003-309572 | 10/2003 |
| JP | 2004-032552 | 1/2004 |
| JP | 2004-080400 | 3/2004 |
| WO | WO2004/038938 | 5/2004 |

OTHER PUBLICATIONS

Notification of Reason(s) for Refusal mailed May 22, 2007, from the corresponding Japanese Application.
European Search Report dated Aug. 30, 2006, from corresponding European Application No. 05254678.5-2416.
Benjie Chen, et al. "Span: An Energy-Efficient Coordination Algorithm for Topology Maintenance in Ad Hoc Wireless Networks" Wireless Networks, vol. 8, No. 5, Sep. 2002, pp. 481-494.
Ming Liu, et al. "A Power-Saving Scheduling for IEEE 802.11 Mobile Ad Hoc Network" Computer Networks and Mobile Computing, Oct. 2003, pp. 238-245.

* cited by examiner

*Primary Examiner*—Erika A Gary
(74) *Attorney, Agent, or Firm*—Katten Muchin Roseman LLP

(57) ABSTRACT

A communication terminal is provided with a transmission control unit for controlling a transmission mode in which a broadcast signal is transmitted a plurality of times, and a reception control unit for controlling a reception mode in which the broadcast signal transmitted from another communication terminal is monitored. The transmission control unit and the reception control unit execute the transmission mode and the reception mode cyclically and alternately. To achieve power saving, time reserved for execution of the transmission mode in a cycle is set to be longer than time reserved for execution of the reception mode in the cycle.

11 Claims, 4 Drawing Sheets

COMMUNICATION TERMINAL AND METHOD OF ESTABLISHING COMMUNICATION

BACKGROUND OF THE INVENTION

1. Field of the Invention

The present invention relates to a technology for establishing communication with another communication terminal.

2. Description of the Related Art

With the realization of miniaturization and lightweight of information terminals, it has become common nowadays for people to carry an information terminal. In association with this, study has been vigorously undertaken on the construction of wireless ad hoc network for on-demand communication. In an ad hoc network, base stations and access points are not necessary. It is therefore easy to build a network even in places where no such infrastructure exists. By using an ad hoc network, a plurality of users may enjoy a game together without being constrained in place, as they join each other, bringing their own portable game devices and communicating wirelessly.

An ad hoc network is built by allowing terminals to communicate with each other using technologies such as IEEE802.11 or Bluetooth. No problem with power is presented when a terminal is capable of receiving power supply from an external power supply. In the case of portable terminals, however, it is preferable that battery consumption be reduced as much as possible since such terminals are driven by limited battery power. To address this, a power-saving control process performed after establishing communication is standardized in communication standards such as IEEE802.11.

When two wireless communication terminals come within the communication range of each other, an ad hoc network is built by one of the apparatuses responding to a beacon signal from the other with a request to participate in a network. A communication terminal acknowledges the other communication terminal by performing scanning (search) and receiving a beacon signal transmitted therefrom. When scanning is performed continuously in a situation where it is uncertain whether the other communication terminal is within the communication range, significant power is consumed. A portable communication terminal is usually carried with a person. It is therefore expected that another communication terminal comes within the communication range as the person moves. For this reason, users have a desire to locate a partner for communication by pressing a button for execution of a search at intervals of 10-100 seconds. However, the operation for a search is inconvenient for users. It is desirable that the communication terminal be provided with the function for automatic search. Users also have a desire to let nearby terminals know the presence of their own terminals.

SUMMARY OF THE INVENTION

Accordingly, an object of the present invention is to provide a technology capable of searching for another communication terminal automatically and efficiently notifying another nearby communication terminal of its own presence, and also to provide a technology for saving power consumed in this process.

In order to achieve the aforementioned objects, the present invention provides a communication terminal comprising: a transmission control unit which controls a transmission mode in which a broadcast signal is transmitted a plurality of times; and a reception control unit which controls a reception mode in which the broadcast signal transmitted from another communication terminal is monitored, wherein the transmission control unit and the reception control unit execute the transmission mode and the reception mode alternately. The transmission control unit and the reception control unit execute the transmission mode and the reception mode alternately. With this, a communication terminal is capable of notifying another communication terminal of its own presence and is capable of searching for another communication terminal, without requiring the user's attention.

Arbitrary combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

Figure 1:
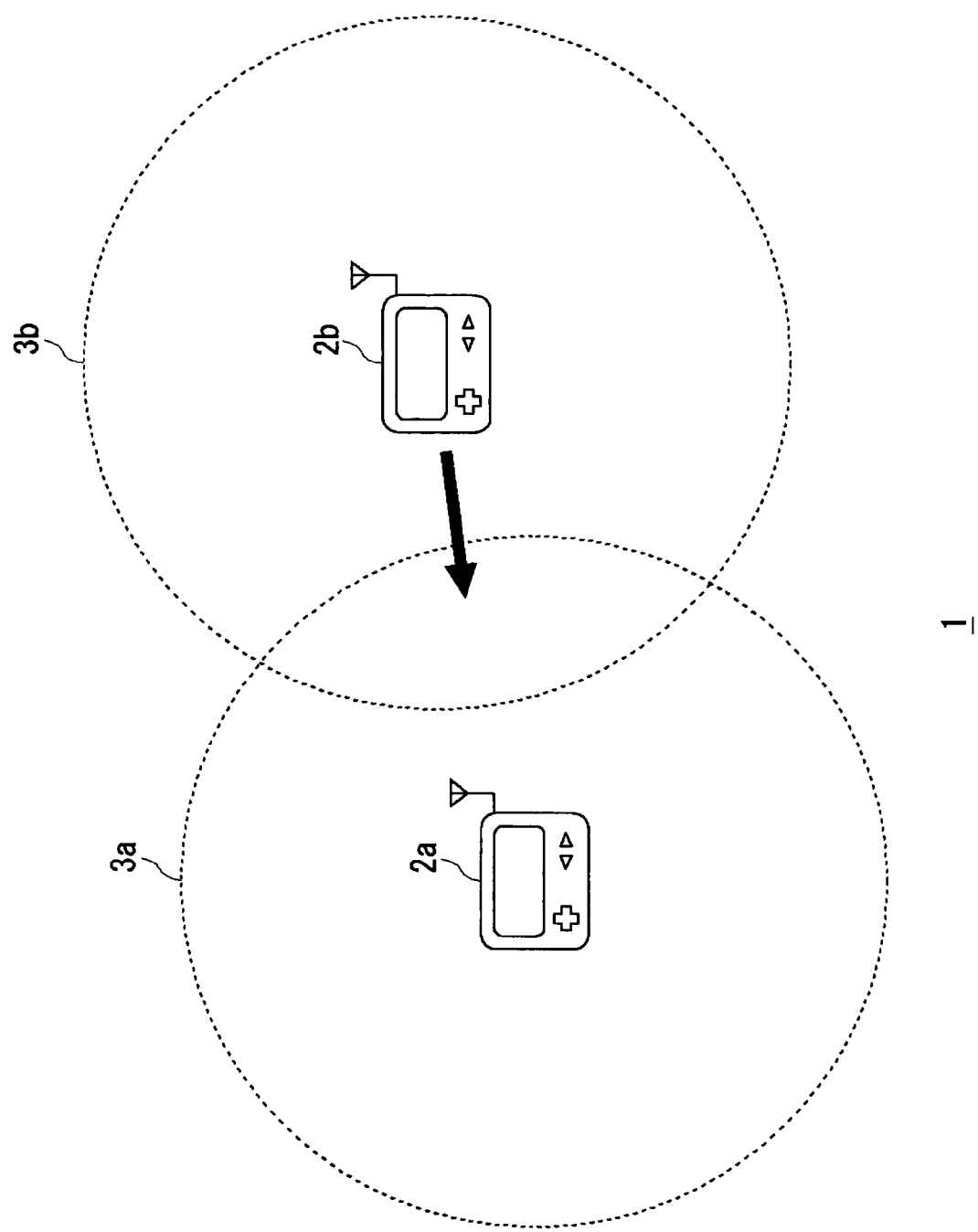
FIG. 1 illustrates a communication system according to an example.

FIG. 1 illustrates a communication system 1 according to an example of the present invention. The communication system 1 is comprised of a plurality of wireless communication terminal (hereinafter, simply referred to as "communication terminals"). In FIG. 1, two portable game devices 2a and 2b (generically referred to as game devices 2 as required) are illustrated as examples of the communication terminals. The number of game devices 2 is not limited to two. Three or more devices may be provided. Each of the game devices 2 is provided with a wireless communication function. By bringing a plurality of game devices 2 together, a wireless network is built. A wireless ad hoc network is built by using a wireless LAN standard such as IEEE802.11b.

The game device 2a has a communication range 3a and the game device 2b has a communication range 3b. It will be assumed that the communication range 3a is identical in size with the communication range 3b. In the illustrated state, the devices are not within the communication range of each other and therefore cannot recognize each other. When the game device 2b enters the communication range 3a as indicated by an arrow, the game device 2a simultaneously enters the communication range 3b so that communication can be established between the devices.

To establish communication, it is necessary for the game device 2b to receive a beacon signal (broadcast signal) transmitted by the game device 2a. The game device 2b should respond to the signal by transmitting a request to participate in a network and the game device 2a should receive the request. When an ad hoc network is built between friends, communication can be established in a short period of time by turning the power of the game devices 2 on under a mutual agreement, and by allowing one of the devices to respond to the beacon signal from the other with a request for participation. In contrast, if a user wishes to play a game with an unknown, nearby person, the user can start the game when a search upon power-on of the game device 2 immediately succeeds in finding a game partner. When a game partner cannot be found for a short time, battery power consumption maybe increased because the search time will be long to find a game partner.

Meanwhile, since the game device 2 is portable and used in a mobile environment, it might be able to enter communication with another game device at any moment. Accordingly, the game device 2 according to the example executes a search immediately upon power-on and enters a power-saving, standby mode when a game partner cannot be found in the search. In a standby mode, the game device 2 can expect to encounter a nearby game device while maintaining low power consumption. The user may enjoy playing a game in a single-player mode using the game device 2 in the standby mode.

Figure 2:
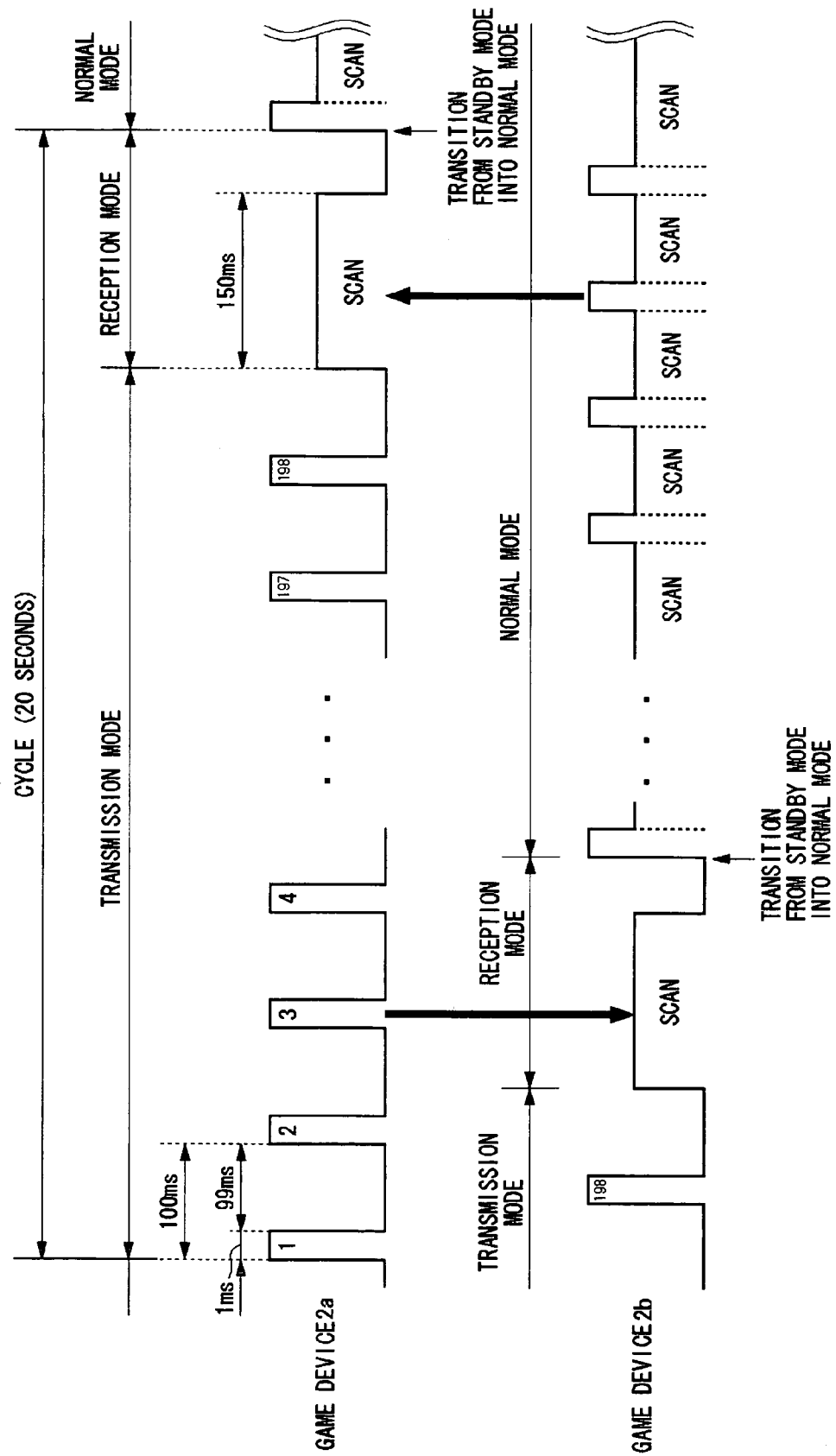
FIG. 2 is a timing chart for a standby mode according to the example.

FIG. 2 is a timing chart for a standby mode according to the example. In the standby mode, the game device not only searches for a nearby terminal but also broadcasts its own presence. With this, even when another communication terminal in the communication range is only executing a search, the game device can notify the another communication terminal of its presence, making it possible to establish communication with the another communication terminal. FIG. 2 illustrates a case where both of the game devices 2a and 2b are executing the standby mode according to the example. Both of the game devices 2a and 2b are executing the standby mode before entering the communication range of each other. FIG. 2 illustrates the behavior of the devices when the game device 2b of FIG. 1 enters the communication range 3a of the game device 2a and the game device 2a simultaneously enters the communication range 3b of the game device 2b.

The game device 2 according to the example is provided with a processor primarily performing an operation related to game processes and an air interface apparatus performing an operation related to communication. The standby mode is executed by the air interface apparatus. While the standby mode is being executed, the user may enjoy a game alone. Alternatively, the supply of power to the processor may be suspended when the user does not play the game. Irrespective whether the user plays in a single-player mode, the user can benefit from power-saving in the standby mode by suspending the supply of power to the air interface apparatus as appropriate.

In the standby mode according to the example, a transmission mode in which a broadcast signal is transmitted a plurality of times and a reception mode in which a broadcast signal transmitted from another communication terminal is monitored are alternately executed. In the example, a combination of the transmission mode and the reception mode which are alternately executed constitutes a single cycle of the standby mode. In the cycle, periods of executing the transmission mode and the reception mode are preferably fixed to make it simple to control the execution of these modes. The transmission mode enables notifying the nearby communication terminal of the device's presence. The reception mode enables recognition of the presence of another nearby communication terminal. In the transmission mode, power saving is achieved by limiting the operation to simple ones. Further, by appropriately setting a ratio between a time scheduled for execution of the transmission mode, which is highly effective in saving power, and a time scheduled for execution of the reception mode, power saving is achieved by the standby mode as a whole. In one cycle of the standby mode, the transmission mode and the reception mode are executed in turn. In the standby mode, at least one cycle is repeated.

In the transmission mode, a communication terminal transmits a beacon signal, a broadcast signal, at predetermined time intervals. The time interval may be set to, for example, 100 msec. In the transmission mode, the air interface apparatus of the communication terminal transmits a beacon signal and immediately makes a transition from a running (operating) state to a power-saving state (sleep state). By reducing power consumption while a beacon signal is not transmitted, the battery is prevented from running down excessively. Immediately prior to the transmission of a beacon signal, the air interface apparatus is caused to make a transition from the power saving state to the running state. When the beacon signal has been transmitted, the apparatus immediately makes a transition to the power saving state again. In the transmission mode, the transmission of a beacon signal and the transition between power states alternate repeatedly.

The transmission of a beacon signal itself requires a period of time of approximately 500 μsec. Considering the time required for state transition of the air interface apparatus, a minimum of 1 msec is only required between the start-up of the air interface apparatus and the termination of the operation thereof. Thus, as illustrated in FIG. 2, in a period of 100 msec of a beacon transmission cycle (beacon interval), a power-saving state lasting 99 msec is secured for each running state lasting 1 msec. Accordingly, power consumption in the transmission mode is significantly reduced. As described above, in the transmission mode according to the example, the air interface apparatus of the communication terminal transits from a running state to a sleep state immediately after transmitting a beacon signal in order to save power consumption. After transiting to the sleep state, the air interface apparatus transits from the sleeping state to the running state when a beacon signal should be transmitted, that is, 99 msec passes. In the transmission mode, the other processes except for the transmission of a beacon signal which consume a power of the air interface apparatus are not performed.

In the reception mode, the communication terminal monitors a beacon signal transmitted from another communication terminal for a predetermined period of time. The requirement for the monitoring period is that the duration thereof is longer than an interval between beacon signals transmitted from another communication terminal. It is preferable that the duration be as short as possible from the viewpoint of power consumption. In the example, the game device 2b is executing the same standby mode as the game device 2a. The beacon cycle of the game device 2a and the game device 2b is 100 msec. Accordingly, the duration of monitoring period is required to be longer than the time interval between beacon signals transmitted from within the device, i.e. longer than 100 msec. More specifically, a minimum monitoring period may be set to a duration which is a sum of the beacon interval (100 msec) and a time required for reception of a beacon signal. In the illustrated example, the monitoring period, i.e. scan time, is set to 150 msec. By setting the monitoring period to be longer than 100 msec, i.e., to be longer than a sum of the time required for reception of a beacon signal and 100 msec, it is ensured that the game device 2a successfully receives a beacon signal, etc. from the game device 2b.

The transmission mode and the reception mode are executed within a cycle. It is preferable that the time for execution of the transmission mode be longer than the time for execution of the reception mode. In the transmission mode, the apparatus is maintained in a power-saving state outside the period for transmission of a beacon signal. Therefore, power consumption is significantly reduced. In the reception mode, it is necessary to monitor a beacon signal for a predetermined period of time. Therefore, power consumed in the reception mode is larger than that of the transmission mode. Further, when the game devices 2a and 2b are executing the same standby mode as illustrated, overlapping of the periods for execution of the reception mode is unfavorable in that it leads to waste in consumed power. For the reasons stated above, it is preferable that the duration of the period for execution of the reception mode be short. In the example illustrated in FIG. 2, the transmission mode is executed for 19.8 seconds in an entire cycle of 20 seconds, while the reception mode is executed for 0.2 seconds. In the transmission mode, a total of 198 beacon signals are transmitted.

In the example of FIG. 2, the air interface apparatus remains running (active) for 348 msec=(1 msec×198+150 msec) in a single cycle of the standby mode. Thus, the running period is 348 msec, where the running period is the summation time in a single cycle of the standby mode in which the air interface apparatus maintains the running state. Compared with the entire cycle of 20 seconds, the occupancy ratio of the running period is 0.0174=348 msec/20 seconds. This means that 98% reduction in power consumption is achieved from what is consumed in a state in which the air interface apparatus is maintained running for 20 seconds continuously. As the above-mentioned equation for calculating the running period shows, the time for execution of the reception mode affects the running period of the air interface apparatus in a cycle more significantly than that of the transmission mode since power saving control is applied in the transmission mode. Therefore, by reducing the time for execution of the reception mode as much as possible, the efficiency of power saving in the standby mode is increased.

When a game device 2 recognizes a nearby terminal in the reception mode, the game device 2 terminates the standby mode and transits from the standby mode into the normal mode. The air apparatus of the game device 2 is set to an ordinary running state. In the illustrated example, the game device 2b first detects the presence of the game device 2a, terminates its standby mode and makes a transition to the normal mode. The game device 2b continues to transmit a beacon signal in the normal mode at intervals of 100 msec. IEEE802.11b employs carrier Sense Multiple Access with Collision Avoidance (CSMA/CA) as an access control scheme in the MAC layer. Therefore, strictly speaking, when the protocol of IEEE802.11 is employed, the device is not allowed to transmit a beacon signal freely in the normal mode. However, this is not a point of direct significance to the present invention and its effects will not be considered. When receiving a beacon signal in the reception mode, the game device 2a makes a transition to the normal mode. In the normal mode, the game device 2a accepts a response or a beacon signal from the other communication terminal for a predetermined period of time subsequent to the transmission of a beacon signal. When the game devices enter the normal mode, they are ready to receive a response or a beacon signal from the other party and establish communication.

More specifically, upon reception of a beacon signal from the game device 2a in the reception mode, the game device 2b acquires the SSID of the network formed by the game device 2a by referring to the beacon signal. With this, the game device 2b enters the normal mode so that it is capable of transmitting a request to participate in the network to the game device 2a as well as transmitting a beacon signal. Since the game device 2a is in the transmission mode, it cannot respond to the request for participation received from the game device 2b. Subsequently, upon receiving a beacon signal of the game device 2b in the reception mode, the game device 2a acquires the SSID of the network formed by the game device 2b by referring to the beacon signal. Consequently, the game device 2a enters the normal mode and transmits a request for participation in the network to the game device 2b. As described, when both the game device 2a and the game device 2b enter the normal mode, the devices already have the knowledge of the SSID of each other's network. Therefore, mutual communication can be established upon a request for participation in the network from one device to the other.

The game device 2b entering the normal mode in advance of the game device 2a may analyze the beacon signal received from the game device 2a and transmit a request for participation in the BSS of the game device 2a at intervals of 100 msec. By providing the game device 2a with the function of receiving, in the reception mode, not only a beacon signal but also a request for participation, the game device 2a is capable of receiving a request for participation from the game device 2b. This will enable early establishment of communication between the game device 2a and the game device 2b.

When the protocol of IEEE802.11 is employed, the period for monitoring a signal from another communication terminal in the reception mode may preferably be determined in consideration of delay in beacon signal transmission due to carrier sense. In the example of FIG. 2, the monitoring period in the reception mode is set to last 150 msec. The entirety of 200 msec scheduled for the reception may be assigned to monitoring. Alternatively, the reception mode may be expanded to, for example, 300 msec and the monitoring period may be set to a duration within the range of 300 msec. For example, the duration of monitoring period may preferably be set to a sum of a beacon interval and a minimum predetermined time with which the transmission of a beacon signal is delayed to allow for carrier sense. With this, the likelihood of the beacon signal being received successfully even when the transmission of a beacon signal is delayed is increased. The game device 2b in the normal mode receiving a beacon signal from the game device 2a does not transmit its own beacon signal for a predetermined minimum period of time. Accordingly, it is preferable to set a time in the game device 2a that elapses since the transmission of the last beacon signal in the transmission mode until the entry into the monitoring period to be slightly shorter than the time predetermined minimum period of time. With this, power is prevented from being wasted in the game device 2a.

Figure 3:
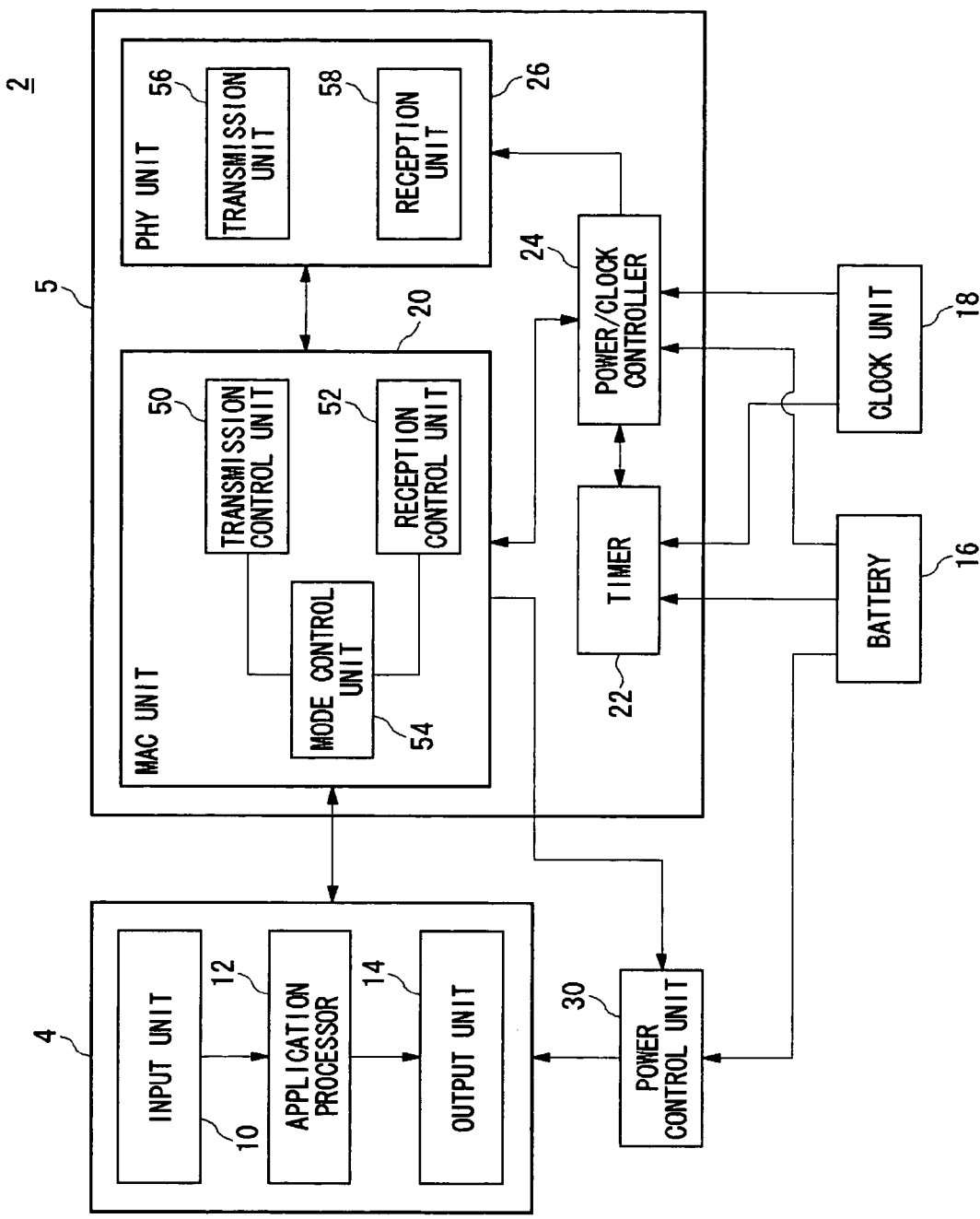
FIG. 3 is a functional block diagram of a game device.

FIG. 3 is a block diagram of the game device 2. The game device 2 is provided with a processor 4 for executing an operation related to game processes, and an air interface apparatus 5 for executing an operation related to communication. The game device 2 is further provided with a battery 16 for supplying power, a clock unit 18 for generating pulses at predetermined time intervals and a power control unit 30 for controlling power supplied to the processor 4. The processor 4 is provided with an input unit 10, an application processor 12 and an output unit 14. The air interface apparatus 5 is provided with a MAC unit 20, a timer unit 22, a power/clock controller 24 and a PHY unit 26. The MAC unit 20 is provided with a transmission control unit 50, a reception control unit 52 and a mode control unit 54. The PHY unit 26 is provided with a transmission unit 56 and a reception unit 58.

The processes in the standby mode according to the example are implemented in the air interface apparatus 5 by a CPU, a memory and a program loaded into the memory. FIG. 3 depicts function blocks implemented by the cooperation of the elements. The program may be built in the game device 2 or supplied from an external source in the form of a recording medium. Therefore, it will be obvious to those skilled in the art that the functional blocks may be implemented by a variety of manners including hardware only, software only or a combination of both.

The input unit 10 comprises a group of buttons including an arrow key that accept commands from a user for operation.

The application processor 12 runs a game application by referring to the command input via the input unit 10 and status information from another game device 2 received via the PHY unit 26. The output unit 14 comprises a display and a speaker etc. for output of the result of process in the application processor 12. The local status information processed in the application processor 12 is stored in a buffer in the MAC unit 20.

The clock unit 18 supplies a clock to the timer 22 and the power/clock controller 24. The timer may be an independent element as illustrated. Alternatively, the timer 22 may be a function built in the MAC unit 20 or in the power/clock controller 24. The battery 16 supplies power to the power control unit 30, the timer 22 and the power/clock controller 24. The power control unit 30 controls power supply to the processor 4. As described above, the user may enjoy playing a game in a single-player mode using the game device 2 in the standby mode. In the standby mode, the battery 16 supplies power intermittently to the air interface apparatus 5. When the user plays a single-player game in the standby mode, the power control unit 30 supplies power to the processor 4. When the user does not play a single-player game, the MAC unit 20 transmits a request for suspension of power supply to the power control unit 30. The power control unit 30 suspends the supply of power to the processor 4 in the standby mode. With this, the processor 4 is turned off in the standby mode so that further power saving is achieved.

The transmission control unit 50 of the MAC unit 20 is provided with the function of generating a beacon signal and analyzing a beacon signal received from another game device 2 via the PHY unit 26. The transmission unit 56 in the PHY unit 26 transmits a beacon signal to a nearby game device 2 and the reception unit 58 receives a beacon signal from another game device 2. The transmission control unit 50 controls the operation for transmission in the transmission unit 56 and the reception control unit 52 controls the operation for reception in the reception unit 58.

The power/clock controller 24 controls the supply of power and clock to the MAC unit 20 and the PHY unit 26. More specifically, the power/clock controller 24 causes the MAC unit 20 and the PHY unit 26 to make a transition from a running state to a sleep state or from a sleep state to a running state.

In the example, the transmission control unit 50 controls the transmission mode in which a broadcast signal is transmitted a plurality of times. The reception control unit 52 controls the reception mode in which a beacon signal transmitted from another game device 2 is monitored. The timing according to which the transmission control unit 50 executes the transmission mode and the timing according to which the reception control unit 52 executes the reception mode are controlled in accordance with an instruction supplied from the mode control unit 54. The mode control unit 54 receives a timing signal from the power/clock controller 24 and supplies an execution instruction to the transmission control unit 50 and the reception control unit 52 so that the transmission mode and the reception mode are executed alternately and cyclically. As mentioned before, the mode control unit 54 sets the time for execution of the transmission mode to be longer than the time for execution of the reception mode.

In the transmission mode, the transmission control unit 50 allows the transmission unit 56 to transmit a beacon signal in accordance with an execution instruction from the mode control unit 54. The power/clock controller 24 controls the transmission timing of the transmission unit 56. When a beacon signal is transmitted, the power/clock controller 24 suspends power consumption in the MAC unit 20 and the PHY unit 26 by suspending the supply of clock to the MAC unit 20 and the PHY unit 26 to suspend their operation. With this, the MAC unit 20 and the PHY unit 26 enter a sleep state. Concurrently, the power/clock controller 24 sets the timer 22 so that the MAC unit 20 and the PHY unit 26 return to a running state after a predetermined period of time elapses since their entry into the sleep state.

Referring to the timing chart of FIG. 2, the beacon transmission cycle (beacon interval) is 100 msec and the time required for transmission of beacon is 1 msec. Therefore, the difference therebetween, i.e., 99 msec, is set in the timer 22. The timer 22 counts pulses supplied from the clock unit 18 and supplies a wake signal to the power/clock controller 24 after the predetermined period of time (99 msec) elapses. Upon receipt of the wake signal, the power/clock controller 24 causes the MAC unit 20 and the PHY unit 26 to make a transition to a running state. The power/clock controller 24 repeats this control a predetermined number of times. In the example of FIG. 2, the transmission control unit 50 transmits a beacon signal 198 times before terminating its control on the transmission mode.

Subsequently, the mode control unit 54 directs the reception control unit 52 to enter the reception mode. The reception control unit 52 executes a search and analyzes the beacon signal received in the reception unit 58. The search time is set to 150 msec. When a beacon signal is not received from another communication terminal within this period, the mode control unit 54 directs the transmission control unit 50 to execute the transmission mode.

As described, the mode control unit 54 receives a timing signal from the power/clock controller 24 and controls the operating timing of the transmission control unit 50 and the reception control unit 52. The above cycle of standby mode is repeated. The mode control unit 54 may set an upper limit to the time for execution of the standby mode. For example, the mode control unit 54 may force termination of the standby mode unless a beacon signal is received from another communication terminal.

When the reception unit 58 receives a beacon signal in the reception mode, the reception control unit 52 analyzes the beacon signal. For example, the reception control unit 52 may acquire an SSID included in the beacon signal and supplies the SSID acquired to the mode control unit 54. When receiving the SSID from the reception control unit 52, the mode control unit 54 recognizes that the search is successful. The mode control unit 54 then switches from the standby mode to the normal mode and supplies the SSID to the transmission control unit 50. Information like BSSID or BSSID-TYPE may be used to identify a network.

In the normal mode, the transmission control unit 50 transmits a beacon signal at predetermined beacon intervals and transmits a request for participation including the acquired SSID to the other communication terminal. When the other game device 2 receives the beacon signal and enters the normal mode, communication with the other game device 2 is established when one of the game devices 2 receives from the other a request for participation in the network. As already described, there are several methods to ultimately establish communication.

Described above is an explanation based on the examples. The embodiment is only illustrative in nature and it will be obvious to those skilled in the art that variations in constituting elements and processes are possible within the scope of the present invention.

In the example, the duration of monitoring period is set to be at least longer than the beacon interval and is preferably set to allow for carrier sense. According to one alternative, the monitoring period may be calculated from target power consumption in the standby mode.

Figure 4:
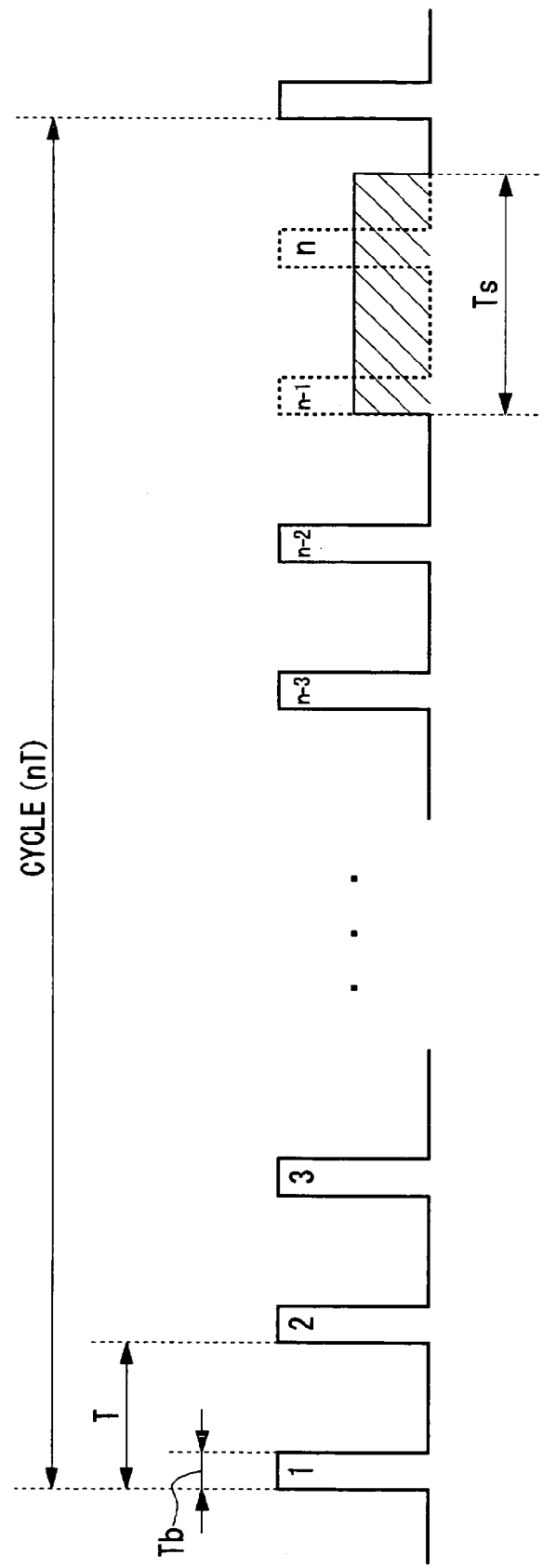
FIG. 4 is a chart for explaining a method of determining a monitoring period (scan time) from target power consumption.

FIG. 4 is a chart for explaining a method of determining a monitoring period (scan time) from target power consumption. The following parameters are defined in this method.

T: beacon interval

Tb: time required for making a transition from the power-saving state to the running state for beacon transmission and returning again to the power-saving state Ts: monitoring period (scan time)

Power consumption per unit time in Tb is denoted by Pt, power consumption in a unit time during the scan is denoted by Pr, and power consumption in a unit time in the power-saving state is denoted by Ps.

In the standby mode, target average power consumption Pave per a unit time is calculated by the following equation.

$$\text{Pave} = Pt \times \frac{Tb(n-x)}{nT} + Pr \times \frac{Ts}{nT} + \frac{Ps(nT - (n-x)Tb - Ts)}{nT}$$

where x denotes the number of beacon signals not transmitted in the monitoring period and calculated by $$x = \text{Quotient}(Ts, T) + 1$$

In the illustrated example, x=2.

Given that Tb is set to 1 msec, the relation between T and Ts is obtained by determining the target average power consumption Pave. By determining the beacon interval T, the monitoring period Ts is determined.

For example, the communication terminal having made a transition from the standby mode to the normal mode may increase the intensity of signal transmission. In the standby mode, as much attention as possible should be paid to power saving since it is uncertain when a partner terminal presents itself. After the transition to the communication mode, the intensity of signal may be increased in order to establish communication successfully and to maintain stable communication. The duration of a cycle is set to 20 seconds in the example. Alternatively, the cycle may last for approximately 5 seconds or 1 minute.

A beacon signal may contain a beacon ID. In the transmission mode, the number of beacon signals transmitted is predetermined. Therefore, the communication terminal first receiving a beacon signal can estimate the time which is required for a beacon signal transmitted from within the terminal to reach the terminal in communication. In the timing chart of FIG. 2, the game device 2b receives a beacon signal of a beacon ID=3 from the game device 2a. It is possible for the game device 2b to expect that a beacon signal transmitted from the game device 2b reaches the game device 2a after about (199−3)×100 msec, i.e., about 19.6 seconds.

What is claimed is:

1. A communication terminal which searches for another communication terminal, comprising:
    a transmission control unit which controls a transmission mode in which a broadcast signal is transmitted a plurality of times at predetermined intervals;
    a transmission unit which transmits the broadcast signal;
    a reception control unit which controls a reception mode in which another broadcast signal transmitted from another communication terminal is monitored for a period of time longer than an interval between the times the broadcast signal is transmitted in the transmission mode;
    a reception unit which receives the other broadcast signal transmitted from the other communication terminal;
    a mode control unit which controls when the transmission control unit starts the transmission mode and when the reception control unit starts the reception mode; and
    a power control unit which controls power for transition from a running state to a power-saving state after the transmission unit transmits the broadcast signal, and which controls power for transition from the power-saving state to the running state before a next time the transmission unit transmits the broadcast signal in the transmission mode, wherein
    the mode control unit executes a standby mode in which the transmission mode and the reception mode are alternately executed in a single cycle, and a time for execution of the transmission mode in the cycle is set to be longer than a time for execution of the reception mode in the cycle.

2. The communication terminal according to claim 1, wherein
    the mode control unit terminates the standby mode after the reception unit receives the other broadcast signal transmitted from the other communication terminal, and
    after the termination of the standby mode, the communication terminal establishes communication with the other communication terminal.

3. The communication terminal according to claim 1, wherein
    after the reception unit receives the other broadcast signal transmitted from the other communication terminal, the reception control unit analyzes the other broadcast signal, and the transmission unit transmits a request for participation in a network to the other communication terminal.

4. The communication terminal according to claim 1, wherein
    after the reception unit receives the other broadcast signal transmitted from the other communication terminal, the reception control unit acquires information which is used to identify a network, and the mode control unit switches from the standby mode to a normal mode, wherein
    the communication terminal accepts a response from the other communication terminal for a predetermined period of time subsequent to the transmission of the broadcast signal.

5. The communication terminal according to claim 4, wherein the communication terminal having made a transition from the standby mode to the normal mode increases an intensity of signal transmission.

6. The communication terminal according to claim 1, wherein
    the mode control unit sets an upper limit to a time for execution of the standby mode.

7. A method of searching for another communication terminal, comprising:
    executing a standby mode in which a transmission mode and a reception mode are alternately executed in a single cycle, wherein a broadcast signal is transmitted a plurality of times at predetermined intervals in the transmission mode, wherein another broadcast signal transmitted from another communication terminal is monitored in the reception mode for a period of time longer than an interval between the times the broadcast signal is transmitted in the transmission mode, and wherein a time for execution of the transmission mode in the single cycle is set to be longer than a time for execution of the reception mode in the single cycle; and controlling power for transition from a running state to a power-saving state after the broadcast signal is transmitted, and controlling power for transition from the power-saving state to the running state before a next time the broadcast signal is transmitted.

8. A program, embodied in a computer readable medium, including instructions that cause a communication apparatus to execute:

executing a standby mode in which a transmission mode and a reception mode are alternately executed in a single cycle, wherein a broadcast signal is transmitted a plurality of times at predetermined intervals in the transmission mode, wherein another broadcast signal transmitted from another communication terminal is monitored in the reception mode for a period of time longer than an interval between the times the broadcast signal is transmitted in the transmission mode, and wherein a time for execution of the transmission mode in the single cycle is set to be longer than a time for execution of the reception mode in the single cycle; and controlling power for transition from a running state to a power-saving state after the broadcast signal is transmitted, and controlling power for transition from the power-saving state to the running state before a next time the broadcast signal is transmitted.

9. A game device comprising:

a processor which executes an operation related to game processes; and an air interface apparatus which executes an operation related to communication, having a transmission control unit which controls a transmission mode in which a broadcast signal is transmitted a plurality of times at predetermined intervals;

a transmission unit which transmits the broadcast signal;

a reception control unit which controls a reception mode in which another broadcast signal transmitted from another communication terminal is monitored for a period of time longer than an interval between the times the broadcast signal is transmitted in the transmission mode;

a reception unit which receives the other broadcast signal transmitted from the other communication terminal;

a mode control unit which controls when the transmission control unit starts the transmission mode and when the reception control unit starts the reception mode; and a power control unit which controls power for transition from a running state to a power-saving state after the transmission unit transmits the broadcast signal, and which controls power for transition from the power-saving state to the running state before a next time the transmission unit transmits the broadcast signal in the transmission mode, wherein the mode control unit executes a standby mode in which the transmission mode and the reception mode are alternately executed in a single cycle, and a time for execution of the transmission mode in the cycle is set to be longer than a time for execution of the reception mode in the cycle.

10. The game device according to claim 9, wherein in the standby mode, the processor is turned off.

11. The game device according to claim 9, wherein the mode control unit terminates the standby mode after the reception unit receives the broadcast signal transmitted from another communication terminal, and after the termination of the standby mode, the communication terminal establishes communication with another terminal.

* * * * *